US010812928B1

(12) United States Patent
Salem et al.

(10) Patent No.: US 10,812,928 B1
(45) Date of Patent: Oct. 20, 2020

(54) AUDIO SERVICE DESIGN FOR OPERATING SYSTEMS

(71) Applicant: Facebook Technologies, LLC, Menlo Park, CA (US)

(72) Inventors: Marc Ihaab Salem, Sunnyvale, CA (US); Sumit Kamath, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/538,638

(22) Filed: Aug. 12, 2019

(51) Int. Cl.
*H04S 7/00* (2006.01)
*H04R 5/02* (2006.01)

(52) U.S. Cl.
CPC ............... *H04S 7/305* (2013.01); *H04R 5/02* (2013.01); *H04S 7/301* (2013.01); *H04S 7/303* (2013.01); *H04S 2420/01* (2013.01)

(58) Field of Classification Search
CPC .......... H04S 7/305; H04S 7/301; H04S 7/303; H04S 2420/01; H04R 5/02
See application file for complete search history.

(56) References Cited

U.S. PATENT DOCUMENTS

2017/0374486 A1* 12/2017 Killham ............... H04N 13/279

\* cited by examiner

*Primary Examiner* — Andrew L Sniezek
(74) *Attorney, Agent, or Firm* — Baker Botts L.L.P.

(57) ABSTRACT

In one embodiment, an audio service executing on a computing device performs a method including receiving, from one or more applications, a number of world-locked audio objects, where each of the world-locked audio objects is associated with a coordinate within a three-dimensional environment; identifying a first subset of the world-locked audio objects and a second subset of the world-locked audio objects, where the first subset includes a number of world-locked audio objects and the second subset includes one or more of the world-locked audio objects that are excluded from the first subset; generating a spherical harmonic object based on the second subset of world-locked audio objects and their associated coordinates; and sending data associated with the first subset of world-locked audio objects and the spherical harmonic object to an audio driver configured to render audio for simultaneous output.

20 Claims, 8 Drawing Sheets

AUDIO SERVICE DESIGN FOR OPERATING SYSTEMS

TECHNICAL FIELD

This disclosure generally relates to an audio service architecture for artificial reality solutions.

BACKGROUND

Artificial reality solutions may comprise an artificial reality device paired to a computing system (a "stage"). The artificial reality device may include without limitation a headset or glasses. The stage may be a computer system or any suitable computing device. Audio architectures for artificial reality solutions may require designs based on multiple constraints, including without limitation audio recording support and audio rendering support in combination with one or more requirements for low latencies, low power consumption, data privacy, and data security. For example, artificial reality devices may require an audio architecture with low-power consumption, enabling the headset to be used for longer periods of time on a single charge, reduce the frequency of recharging, and/or reduce the frequency of battery changes for the headset. In an additional example without limitation, artificial reality devices may require audio architectures with low latency responses to one or more drivers and one or more applications.

SUMMARY OF PARTICULAR EMBODIMENTS

Described herein is a method comprising, by an audio service executing on a computing device, receiving, from one or more applications, a number of world-locked audio objects, wherein each of the world-locked audio objects is associated with a coordinate within a three-dimensional environment; identifying a first subset of the world-locked audio objects and a second subset of the world-locked audio objects, wherein the first subset includes a number of world-locked audio objects and the second subset includes one or more of the world-locked audio objects that are excluded from the first subset; generating a spherical harmonic object based on the second subset of world-locked audio objects and their associated coordinates; and sending data associated with the first subset of world-locked audio objects and the spherical harmonic object to an audio driver configured to render audio for simultaneous output.

In particular embodiments of the method, the generating the spherical harmonic object is further based on at least one of a headset-related transfer function, location, or pose of a user relative to the three-dimensional environment. In particular embodiments of the method, the coordinate within the three-dimensional environment defines an audio source location. In particular embodiments of the method, the data associated with the first subset of world-locked audio objects comprises direct propagation impulse responses, reverb impulse responses, and mono audio streams. In particular embodiments of the method, the method further comprises generating the direct propagation impulse responses and reverb impulse responses based on at least one of a headset-related transfer function, location, or pose of a user relative to the three-dimensional environment. In particular embodiments of the method, the generating the direct propagation impulse responses and reverb impulse responses is further based on a three-dimensional model of at least a portion of the three-dimensional environment. In particular embodiments of the method, the method further comprises receiving one or more additional spherical harmonic objects; and the generating the spherical harmonic object is further based on the one or more additional spherical harmonic objects. In particular embodiments of the method, the method further comprises receiving one or more head-locked audio objects; and the data associated with the first subset of world-locked audio objects and the spherical harmonic object further is further associated with the one or more head-locked audio objects. In particular embodiments of the method, an operating system of the computing device comprises the audio service. In particular embodiments of the method, the one or more applications and the audio driver are each coupled to a synchronized clock reference.

Described herein is one or more computer-readable non-transitory storage media embodying software that is operable when executed by a client device to receive, from one or more applications, a number of world-locked audio objects, wherein each of the world-locked audio objects is associated with a coordinate within a three-dimensional environment; identify a first subset of the world-locked audio objects and a second subset of the world-locked audio objects, wherein the first subset includes a number of world-locked audio objects and the second subset includes one or more of the world-locked audio objects that are excluded from the first subset; generate a spherical harmonic object based on the second subset of world-locked audio objects and their associated coordinates; and send data associated with the first subset of world-locked audio objects and the spherical harmonic object to an audio driver configured to render audio for output.

In particular embodiments of the one or more computer-readable non-transitory storage media embodying software that is operable to be executed by the client device, the coordinate within the three-dimensional environment defines an audio source location. In particular embodiments of the one or more computer-readable non-transitory storage media embodying software that is operable to be executed by the client device, the data associated with the first subset of world-locked audio objects comprises direct propagation impulse responses, reverb impulse responses, and mono audio streams. In particular embodiments of the one or more computer-readable non-transitory storage media embodying software that is operable to be executed by the client device, the software is further operable when executed by the client device to receive one or more additional spherical harmonic objects; and the generating the spherical harmonic object is further based on the one or more additional spherical harmonic objects. In particular embodiments of the one or more computer-readable non-transitory storage media embodying software that is operable to be executed by the client device, the software is further operable when executed by the client device to receive one or more head-locked audio objects to be simultaneously output with the world-locked audio objects; and the data associated with the first subset of world-locked audio objects and the spherical harmonic object is further associated with the one or more head-locked audio objects.

Disclosed herein is a client device comprising one or more processors; and one or more computer-readable non-transitory storage media coupled to one or more of the one or more processors and comprising instructions operable when executed by one or more of the one or more processors to cause the client device to receive, from one or more applications, a number of world-locked audio objects, wherein each of the world-locked audio objects is associated with a coordinate within a three-dimensional environment; identify a first subset of the world-locked audio objects and a second subset of the world-locked audio objects, wherein the first subset includes a number of world-locked audio objects and the second subset includes one or more of the world-locked audio objects that are excluded from the first subset; generate a spherical harmonic object based on the second subset of world-locked audio objects and their associated coordinates; and send data associated with the first subset of world-locked audio objects and the spherical harmonic object to an audio driver configured to render audio for output.

In particular embodiments of the client device, the coordinate within the three-dimensional environment is associated with each of the world-locked audio objects defines an audio source location within the three-dimensional environment. In particular embodiments of the client device, the data associated with the first subset of world-locked audio objects comprises direct propagation impulse responses, reverb impulse responses, and mono audio streams. In particular embodiments of the client device, the instructions are further operable when executed by the one or more processors to receive one or more additional spherical harmonic objects, and the generating the spherical harmonic object is further based on the one or more additional spherical harmonic objects. In particular embodiments of the client device, the instructions are further operable when executed by the one or more processors to receive one or more head-locked audio objects; and the data associated with the first subset of world-locked audio objects and the spherical harmonic object is further associated with the one or more head-locked audio objects.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
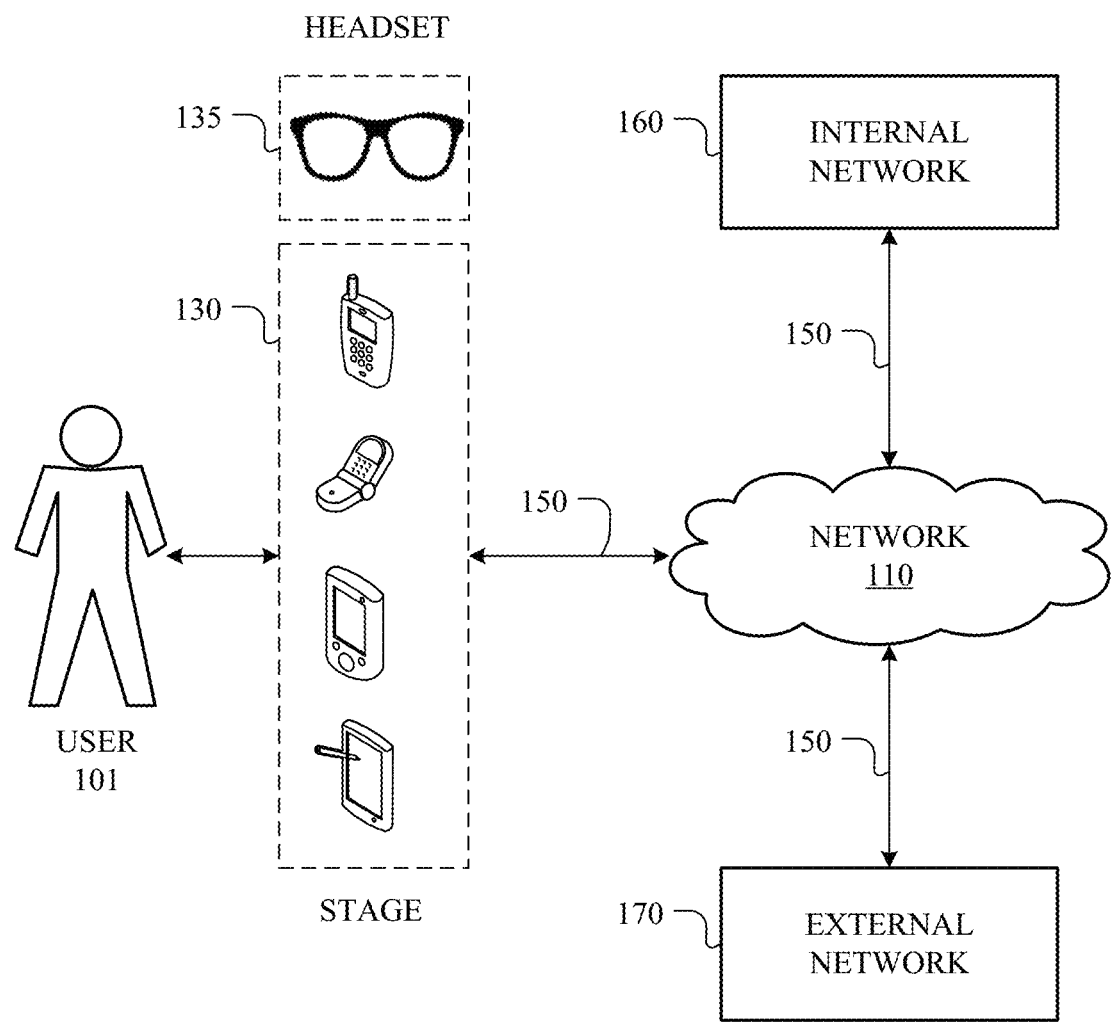
FIG. 1 illustrates an example audio architecture comprising a hardware and software architecture for audio distribution.

FIG. 1 illustrates an example audio architecture comprising a hardware and software architecture for audio distribution. The example audio service architecture may comprise an audio service for distribution of audio operating on an operating system of an artificial reality device. As an example and not by way of limitation, the artificial reality device may be a headset 135 worn by a user 101. The example audio architecture may comprise an audio service for coordinating audio rendering requests and audio recording requests between one or more applications and one or more audio drivers. The exemplary audio service may enable signal processing of audio to produce or modify data associated with the audio. The headset may receive audio data from a computing device 130—the "stage"—and the stage may be coupled to a network 110 via connection 150. As an example and not by way of limitation, the stage 130 may be coupled to a company internal network 160 and to an external network 170 via connections 150.

The headset 135 may comprise one or more speakers oriented to render audio near a user's left ear, and one or more speakers oriented to render audio near the user's right ear. The headset may further comprise one or more microphones and may typically comprise two or more microphones. In particular embodiments, an application may be able to choose to receive audio from a particular direction using a particular one or more microphones disposed toward that direction rather than receiving audio from all microphones simultaneously. This may be referred to as beamforming.

An example artificial reality device may support artificial reality user-oriented audio—"head-locked audio"—as well as environment-oriented audio—"world-locked audio." In particular embodiments, an example audio architecture may incorporate a combination of one or more of one or more world-locked audio objects, one or more head-locked audio objects, and one or more spherical harmonic objects. Head-locked audio may be audio that is rendered in the headset the same way regardless of how the user moves or rotates the headset. As an example and not by way of limitation, a particular head-locked notification may be rendered at the speakers near the user's right ear regardless of the user's headset position or the user's environment. In particular embodiments, head-locked audio may be useful for system notifications and/or background music. Head-locked audio may be limited to two channels such that all head-locked audio streams are mixed and provided as a stereo audio signal for audio generation.

In contrast, world-locked audio may be rendered to simulate audio generated at a particular point in 3D space in the user's environment, such that audio may pan between the left and right speakers as the user moves his or her head to move the headset. That is, panning may comprise the audio increasing in volume when the user's ear moves closer to the apparent source and decreasing in volume when the user's ear moves further from the apparent source, so as to give the impression to the user that the audio source is fixed at the point in front of the user. As an example and not by way of limitation, a particular world-locked audio may be rendered such that it appears to originate from a point directly in front of the user such that the audio is rendered in both left and right speakers at approximately the same volume, but as the user turns his or her head to move one ear closer to the apparent source, the audio may pan based on the user's movements. In particular embodiments, world-locked audio may be useful for providing audio from a real or virtual object appearing in the 3D environment.

Spherical harmonic audio is a generalized form of multi-channel surround sound. Spherical harmonic audio may be used for audio that is not associated with a particular real-world or virtual location. Spherical harmonic audio may include without limitation the audio associated with ambient noise—for example and without limitation, the roar of a crowd in a sports arena and background music. Lower order spherical harmonic audio (i.e., spherical harmonic audio with fewer channels) may be perceived by users as lower quality audio than object-based audio. By processing certain audio objects—for example and without limitation, lower priority world-locked audio objects—as spherical harmonic audio, the example audio architecture may support audio objects provided by one or more applications, while simultaneously supporting a variety of design constraints including without limitation lower latencies, lower power consumption, higher audio quality for higher quality object-based audio objects, and user configurable settings.

In particular embodiments, world-locked audio objects may be more computationally demanding than spherical harmonic and head-locked audio objects. Accordingly, it may be beneficial to limit the number of world-locked audio objects based on one or more limitations including without limitation latency, power consumption, audio quality limitations, and user configurable settings. As an example and not by way of limitation, world-locked audio objects may require processing of metadata, including without limitation environmental metadata and headset position data.

In particular embodiments, the example audio architecture may be responsible for setting priorities of one or more audio objects. These priorities may be used to limit processing of world-locked audio objects to a number of higher priority audio objects while lower priority audio objects are processed and produced as spherical harmonic audio. As an example and not by way of limitation, the audio service may receive multiple world-locked audio objects and may separate the multiple world-locked audio objects into a first subset of higher priority objects for rendering as world-locked audio and a second subset of lower priority audio objects—not containing any of the audio objects from the first subset—for rendering as spherical harmonic audio.

In particular embodiments, audio objects may be associated with metadata. As an example and not by way of limitation, metadata may include a coordinate within a three-dimensional space that defines an audio source location. The audio source location may comprise the spatial "source" of a world-locked audio object—the location from which the audio originates in real or virtual space. The metadata may enable rendering of audio based on the user's orientation relative to the audio source and any real-world or virtual objects within the three-dimensional environment.

In particular embodiments, the stage may provide audio objects to the headset at a particular frequency and the headset may be tasked with rendering and outputting appropriate audio between receipt of sequential audio objects from the stage. For example, the stage may provide audio objects to the headset in frames—audio data blocks—at regular time intervals. These time intervals may correspond to a frame rate—the rate at which frames are received. The headset may be tasked with rendering audio based on this framerate and may be further tasked with rendering audio for subframes. As an example and not by way of limitation, if the stage provides an audio object at 30 Hz, the headset may produce audio at 120 Hz—for example, using interpolation—to produce a smoother audio experience for the user. In particular embodiments, rendering audio at a frequency greater than the frequency at which audio is received from the stage may be important to ensuring a high-quality user experience. This may be particularly important when the headset moves between audio frames and rendering audio in subframes may prevent the audio from appearing to jump across the three dimensional environment. Similarly, the headset may take into account relative position between the headset and each audio source—for example and without limitation, based on Simultaneous Localization and Mapping (SLAM) and Inertial Measurement Unit (IMU) data and a world map of the real-world and/or virtual environment surrounding the user—to render audio with appropriate spatial clues.

In particular embodiments, the artificial reality audio architecture may provide applications and/or users with options to manage latency, power, audio quality, and other requirements as well as to manage the complexity of the multiple world-locked and/or head-locked audio objects. In particular embodiments, the audio architecture may require additional processing to isolate audio generation and/or audio recording by applications from the audio drivers to enable data privacy and security. As an example and not by way of limitation, the audio architecture may employ one or more filtering techniques to prevent audio data from leaking between applications.

In particular embodiments, world-locked audio objects may be produced based at least in part on location metadata and a mono audio stream provided by an application. The location metadata for the world-locked audio object may be used with SLAM/IMU generated World-Mesh data to generate a direct-propagation impulse response and a reverb impulse response. These impulse responses (IRs) may be used together with a headset-related transfer function (HRTF), user location, and user pose (also provided by SLAM/IMU) to create accurate spatial audio data.

As noted herein, certain world-locked audio objects may be prioritized and lower priority world-locked audio objects may be processed as spherical harmonic audio. In particular embodiments, spherical harmonic audio may be produced as multi-channel audio, comprising between 8 and 32 channels, inclusively, depending on at least fidelity requirements and computational requirements. One benefit of spherical harmonic audio is the bandwidth between the headset and stage may not expand based on the number of spherical harmonic audio sources. Additionally, the headset computational requirements may not expand based on the number of spherical harmonic audio sources. However, computational requirements and bandwidth requirements may increase with the number of audio channels. In particular embodiments, all audio in the world space may be rendered in a maximum of 32 channels. By setting a maximum number of channels for audio, spherical harmonic audio may scale well and may provide a beneficial format for background audio.

In particular embodiments, the stage 130 may be an electronic device including hardware, software, or embedded logic components, or a combination of two or more components capable of carrying out appropriate functionalities. As an example and not by way of limitation, a stage 130 may include a computer system such as a desktop computer, notebook or laptop computer, netbook, a tablet computer, e-book reader, GPS device, camera, personal digital assistant (PDA), handheld electronic device, cellular telephone, smartphone, artificial/virtual reality device, other suitable electronic device, or any suitable combination thereof for communication with an artificial/virtual reality device. This disclosure contemplates any suitable stages. A stage 130 may enable a network user using stage 130 to access network 150.

Link 150 may connect stage 130 to network 110. In particular embodiments, stage 130 may be coupled to an internal network 160 via links 150 and network 110. In particular embodiments, stage 130 may be coupled to an external network 170 via links 150 and network 110. This disclosure contemplates any suitable links 150. In particular embodiments, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each may include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link including without limitation links 150, or a combination of two or more such links 150. Links 150 need not necessarily be the same throughout network environment 110. One or more first links 150 may differ in one or more respects from one or more second links 150.

In particular embodiments, each of an internal network 160 and/or external network 170 may include one or more types of servers, one or more data stores, one or more interfaces, including but not limited to APIs, one or more web services, one or more content sources, one or more networks, or any other suitable components. An internal network 160 and/or external network 170 may be operated by a different entity. In particular embodiments, however, internal network 160 and/or external network 170 may operate in conjunction with each other to provide services to users.

Figure 2:
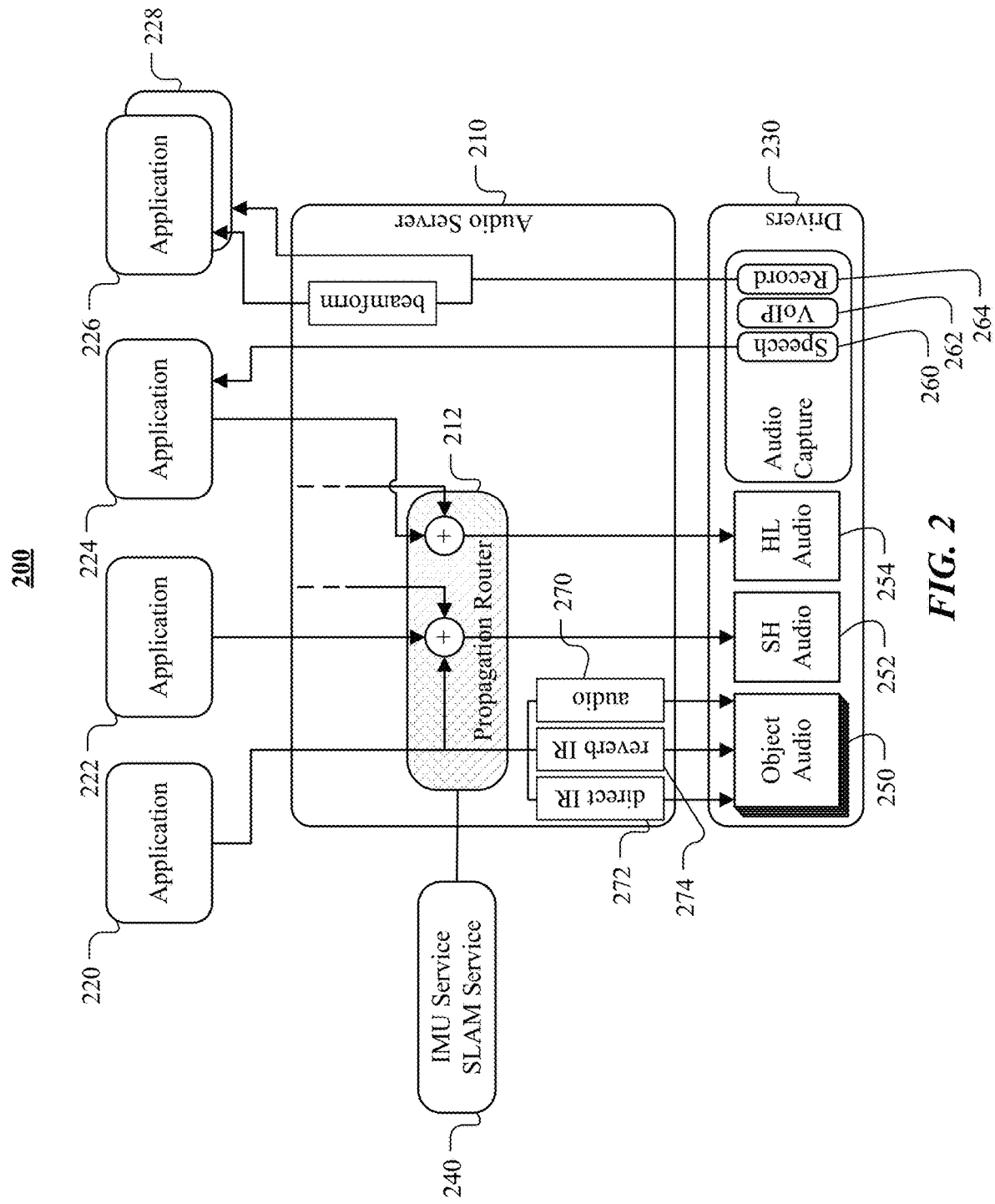
FIG. 2 illustrates an example audio architecture comprising a hardware and software architecture for audio distribution.

FIG. 2 illustrates an example audio service architecture comprising a hardware and software architecture for audio distribution. FIG. 2 illustrates an example audio architecture 200 comprising one or more applications 220, 222, 224, 226, an audio service 210, and one or more drivers 230. Generally, the audio service 210 may act as a middleman between the applications 220, 222, 224, 226, and drivers 230. In particular embodiments, the drivers 230 may be coupled to a digital signal processor (DSP) (not shown). The audio service 210 may process audio data from the applications 220, 222, 224, 226 before distribution to the driver 230. As an example and not by way of limitation, the audio service 210 may process a stereo audio stream to produce one or more spherical harmonic audio objects and may process one or more world-locked audio objects to generate one or more of one or more direct impulse responses and one or more reverb impulse responses.

The one or more applications 220, 222, 224, 226 may be coupled to the audio service 210 and the audio service 210 may be coupled to the one or more drivers 230. The audio service 210 may receive one or more application audio objects from the one or more applications 220, 222, 224, 226. In particular embodiments, the audio service 210 may also receive metadata associated with the one or more application audio objects, including without limitation metadata. The audio service may process a certain one or more audio objects to produce a single spherical harmonic audio object that may be provided to the one or more audio drivers. Similarly, the audio service 210 may process one or more audio objects to produce a single head-locked audio object that may be provided to the one or more audio drivers 230. Additionally, the audio service 210 may process one or more audio objects to produce one or more of one or more mono audio streams, one or more direct impulse responses, and one or more reverb impulse responses, all of which may be provided to the one or more audio drivers 230. The audio service 210 may also receive data, including without limitation metadata, from an IMU service and/or a SLAM service 240. The SLAM/IMU data may be incorporated as part of the processing of one or more world-locked audio objects and/or one or more impulse responses.

In particular embodiments, the audio service 210 may comprise a propagation router 212. The propagation router 212 may comprise one or more software mixers (not shown). As an example and not by way of limitation, the propagation router 212 may mix audio data received from one or more applications to produce one or more head-locked audio objects 254. In FIG. 2, the propagation router 212 mixes audio data received from applications 220, 222 (shown by audio data from application 220 and from application 222 combining at a software mixer (not shown)). The propagation router 212 may generate data comprising direct impulse responses 272, reverb impulse responses 274, and mono audio streams 270 corresponding to world-locked audio 250 based at least in part on data from one or more of a SLAM service, IMU service 240, and/or location metadata. In particular embodiments, the propagation router 212 may be responsible for mixing and/or distributing audio objects to the audio drivers 230. As an example and not by way of limitation, the propagation router 212 may mix audio data originating from two separate objects that occupy a similar world location to create a single world-locked audio object.

In particular embodiments, if the number of world-locked audio objects exceeds a maximum number of world-locked audio objects permitted by one or more configuration settings of the audio service 210, the propagation router 212 may process only certain application audio objects to render world-locked audio 250 for distribution to the one or more audio drivers 230. The remaining lower priority application audio objects may be instead be processed as spherical harmonic audio 252. As an example and not by way of limitation, high priority application audio objects provided by application 220 may comprise world-locked audio objects provided to the propagation router 212 and processed to produce data comprising direct IR 272, reverb IR 274, and mono audio 270 that may be provided to the driver 230 to render world-locked audio 250. In contrast, lower priority application audio objects from application 220 may be routed by the propagation router 212 to software mixer (not shown) to be combined with application audio objects from one or more other applications such as application 222 to produce spherical harmonic audio 252 before provision to the driver 230.

The one or more applications 220, 222, 224, 226 may also receive audio data captured by drivers 230 and passed by the audio service 210 to enable recording. The audio service 210 may coordinate receiving audio recording data from the one or more drivers 230 and distributing the audio recording data to the one or more applications 220, 222, 224, 226. In particular embodiments, the audio service 210 may process the audio recording data, for example without limitation by beamforming the audio data as shown in FIG. 2 for audio recording data provided to application 226. The one or more drivers 230 may expose one or more devices for recording various recording types, including without limitation a speech device 260, a Voice over IP (VoIP) device 262, and general recording device 264. In particular embodiments, the speech device 260 and VoIP device 262 may be mono devices or stereo devices, while the general recording device 264 may be a multi-channel device (for example, an 8-channel device) that is provided to the audio service 210 to enable beamformed audio as a mono device. As an example and not by way of limitation, application 226 may request the audio service beamform multiple microphones to a particular location to receive a mono audio data stream unlike application 228 that receives the audio data without additional processing; however, beamforming and other processing may increase latency and require additional computational resources.

The DSP (not shown) coupled to the drivers 230 may expect to receive a frame at regular time intervals. These time intervals may correspond to a DSP frame rate. The DSP frame rate may be the rate at which the audio service 210 will initiate a transfer to the driver 230 via a direct memory access, "doorbell/mailbox" transfer, or other types of transfers known in the art. The driver 230 may encounter latency of one or more DSP frames. As an example and not by way of limitation, latency may occur as a result of tuning. The driver 230 may also encounter latency associated with the mixing time of the propagation router 212. The DSP frame rate, and the corresponding DSP frame time, may correspond to the size of each frame in the driver buffer.

Figure 3:
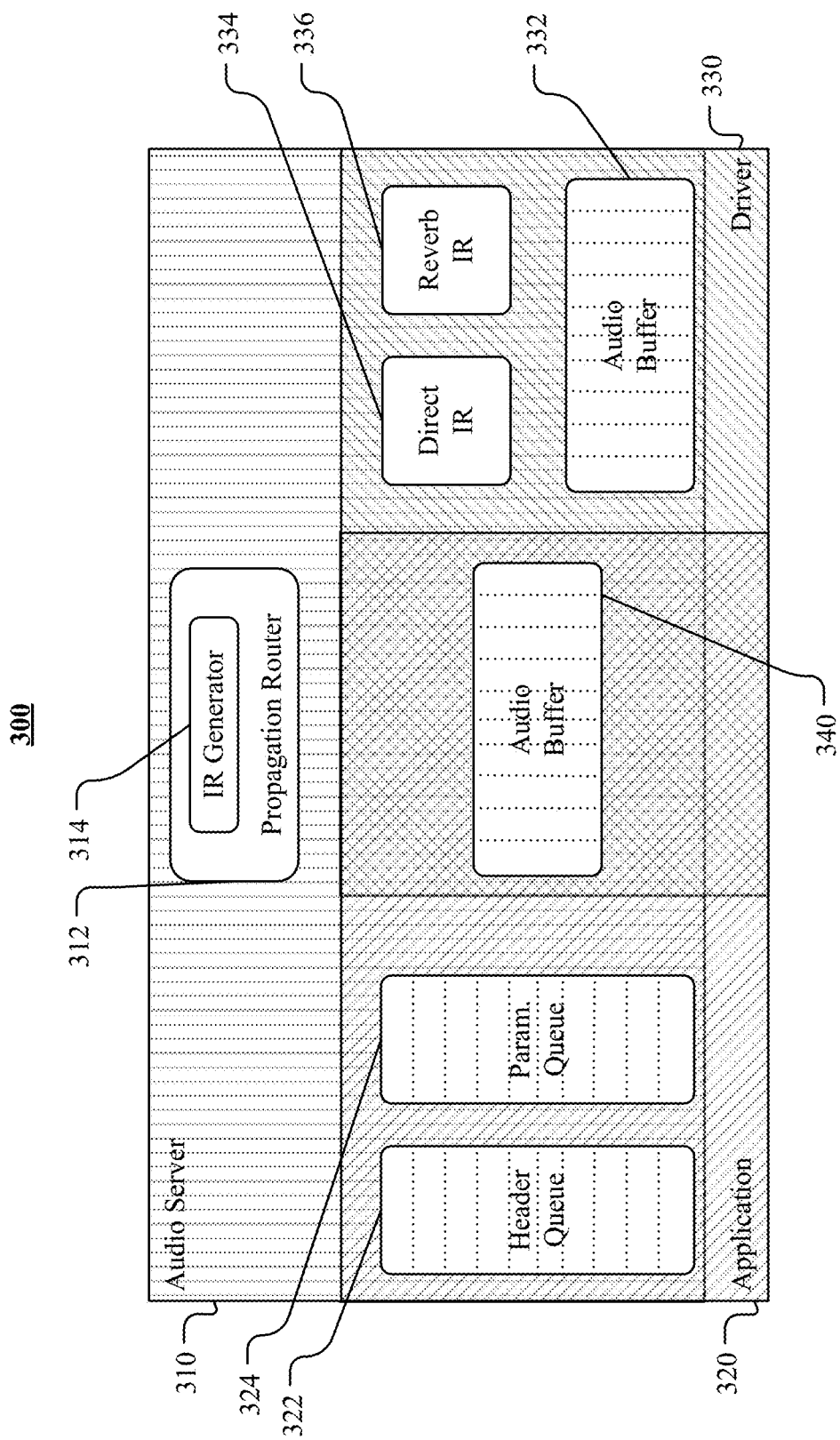
FIG. 3 illustrates an example audio architecture for rendering audio.

FIG. 3 illustrates an example audio service architecture for rendering audio data. An example audio service architecture may comprise an application 320, an audio service 310, and a driver 330. The application 320 may comprise a header queue 322, a parameter queue 324, and an audio buffer 340, wherein the queues 322, 324 may be shared with the audio service 310 and the audio buffer 340 may be shared with both the audio service 310 and the driver 330. Shared elements are illustrated in FIG. 3 as shading showing overlapping domains for the application 320, audio service 310, and driver 330. The driver 330 may comprise two audio buffers 332, 340: the mixed IO buffer 332 may be shared by the driver 330 and the audio service 310 and the application IO buffer 340 may be shared with both the audio service 310 and the application 320. The driver 330 may further comprise a direct impulse response buffer 334 and a reverb impulse response buffer 336, which may be both shared with the audio service. In addition to the shared architectural elements, the audio service 310 may further comprise a propagation router 312. The propagation router 312 may comprise an impulse response generator 314. Sharing buffers between architectural components as shown in FIG. 3 may enable use of virtual memory objects (VMOs) to enable zero-data transfers and/or other data transfers that may enable lower latencies and lower power consumption.

Because the head-locked audio and spherical harmonic audio devices are not exclusively used by a single application, packet sizes may be system locked. In particular embodiments, all applications may respect the packet sizes set by the system using predetermined periodic timestamps. Timestamps may be used to coordinate the presentation time of the audio. In particular embodiments, an application may timestamp audio packets to enable fine grain control of audio presentation. In particular embodiments, the audio service may timestamp audio packets on behalf of one or more applications.

Figure 4:
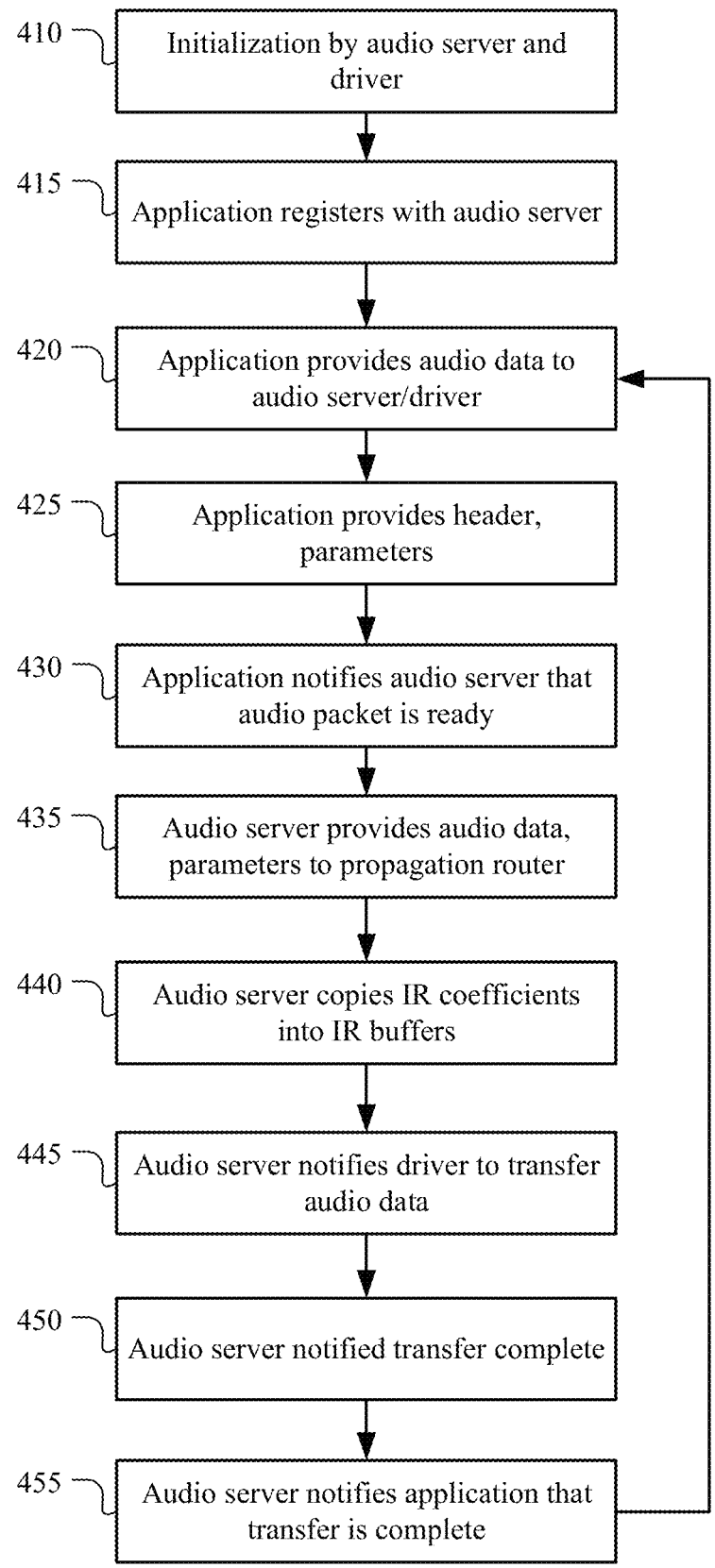
FIG. 4 illustrates an example method for rendering audio.

FIG. 4 illustrates an example method 400 for rendering audio. The method 400 may begin at step 410, where the driver 330 and audio service 310 may be initialized. During initialization, the driver 330 and audio service 310 may configure a shared mixed audio data buffer 332, direct impulse response buffer 334, and reverb impulse response buffer 336. The mixed audio buffer 332 may be allocated to a predetermined size and may be further chunked to multiples of DSP frame sizes.

At step 415, an application 320 may prepare to provide audio data by registering with the audio service 310 to enable sharing of the header and parameter queues 322, 324. Additionally, an audio buffer 340 may be allocated that is accessible by the application 320, audio service 310, and driver 330. For simplicity, this audio buffer 340 may be an integer multiple of audio buffer 332. The application VMO may chunk the audio buffer 340 into packets based on the operating mode where the chunks may correspond to a multiple of the DSP frame time for simplicity. As an example and not by way of limitation, the packet and frames sizes shown in FIG. 3 are identical. An audio packet may comprise a payload or block of audio data. In particular embodiments, an audio packet may comprise multiple frames of audio data. As an example and not by way of limitation, one audio frame may comprise n audio samples and an audio packet may comprise m frames, where n and m represent certain integer values and where m and n may or may not be equal values.

At step 420, the application 320 is ready to stream audio data, or is in a steady streaming state, and may copy audio data into a packet which may be stored in the audio buffer 332. Once the audio data is stored in the buffer 332, both the audio service 310 and driver 330 may access the audio data if necessary.

At step 425, the application 320 may create a header at a particular index in the header queue 322 and add any parameters in the parameter queue 324 at the same index. In particular embodiments, if parameters in the parameter queue 324 are unchanged, the parameter queue 324 at that index may be set to a predefined variable indicating no changes to the parameters.

At step 430, the application 320 may notify the audio service 310 when a packet is ready. As an example and not by way of limitation, the notification may be through a notification/doorbell. In particular embodiments, after notification, the application 320 may not modify the header in the header queue 322, the parameters in the parameter queue 324, or the audio data in the audio packet of the audio buffer 340.

At step 435, the audio service 310 may provide audio data and parameters received from the application 320 to the propagation router 312 to enable processing of impulse responses using the IR generator 314. Note that the audio service 310 may be in a low power mode between DSP frames. The audio service 310 may exit this low power mode upon notification by the application 320 and begin processing the audio data with a presentation time between the current DSP frame time and the next DSP frame time. In particular embodiments, the propagation router 312 may determine if audio data should be directly accessed by the driver 330, if audio data should be mixed with another application's audio, or if the audio data should be processed as spherical harmonic audio based on the number of world-locked audio objects and/or audio data priority. If the audio data should be mixed or processed, the audio service 310 may prioritize these transactions so the mixed or processed audio data may be copied into the audio buffer 332. Processing and/or mixing audio may introduce latency.

At step 440, the audio service 310 may immediately copy IR coefficients from the propagation router into the direct IR buffer 334 and reverb IR buffer 336 shown in FIG. 3. An immediate data transfer of the IR coefficients may reduce latency.

At step 445, the audio service 310 may notify the driver 330 to transfer the audio data from the mixed audio buffer 332 or the application audio buffer 340, either via a direct memory access or though a doorbell/mailbox mechanism. At this time, the audio service 310 and/or propagation router 312 may not modify the audio data in the audio buffer 332.

At step 450, the data transfer from the audio service 310 to the driver 330 is complete and the audio service 310 may receive a notification that it is safe to write to the location in the audio buffer 332 where the audio data was stored.

At step 455, the audio service 310 may notify the application 320 that the audio data has been successfully transferred when the audio service 310 has received enough notifications. In certain embodiments, using more than one notification may support a variety of packet sizes. As an example and not by way of limitation, it may be beneficial for one or more of an application, service, or driver to use different packet sizes based on the options or requirements set within the application, service, or driver. In particular embodiments, larger packet sizes may enable an application, service, or driver to interact with larger audio packets less frequently to, for example and not by way of limitation, enable operation in a low power mode for longer periods and thereby reduce power consumption. In particular embodiments, smaller packet sizes may enable an application, service, or driver to interact with smaller audio packets more frequently to, for example and not by way of limitation, enable a more responsive audio experience for a user. For example, an application may use packet sizes of 10X, while the audio service may use packet sizes of 5X and the audio driver may use packet sizes of X. In this example, the audio driver may operate continuously to process each packet to ensure responsive audio, while the application may reduce power consumption by operating in a low power mode until the audio driver has processed 10 audio packets. In particular embodiments, the owner of the audio data (which may be the driver 330 for audio buffer 332 and may be the audio service 310 for audio buffer 340) is expected to zero the frame/packet.

After the application 320 has been notified that audio data has been successfully transferred to the drivers, the application 320 may return to step 420 and provide additional audio data for rendering. In steady state, the application 320 may fill an audio packet, wait until the packet has been processed, then refill the packet with audio data to be played.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for rendering audio including the particular steps of the method of FIG. 4, this disclosure contemplates any suitable method for rendering audio including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

For spherical harmonic audio, the propagation router may be responsible for transforming streams into the spherical harmonic audio as well as mixing audio data with other spherical harmonic audio streams. For head-locked audio, the propagation router may mix any active stereo streams, spherical harmonic audio streams (after applying the HRTF), and object-based streams (after spatial rendering and applying the HRTF). The propagation router may also copy the head-locked audio post-mixing to the mixed IO buffer. Further, the propagation router may mix multiple streams into a single stream to limit the number of audio streams presented to the audio drivers. There may be sufficient data to mix streams when the packet size is an integer multiple of the frame size and the latency exposed by the audio service 310 and the driver 330 exceeds a single frame time. Note that the direct impulse response and reverb impulse response buffers may be unused for head-locked audio.

Figure 5:
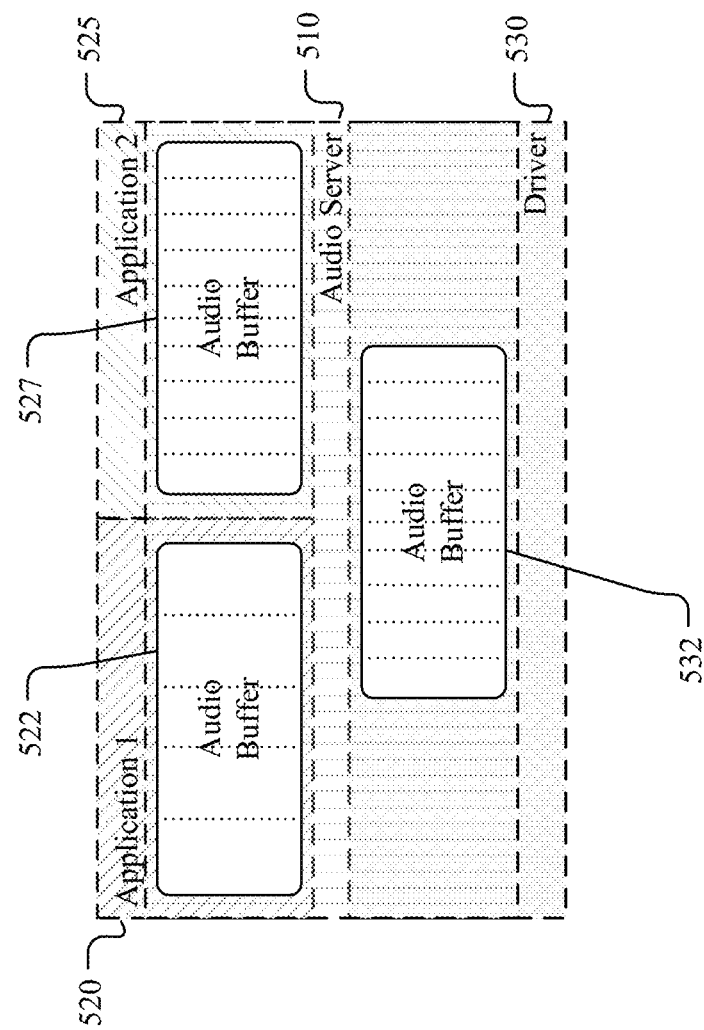
FIG. 5 illustrates an example audio architecture for recording audio.

FIG. 5 illustrates an example audio service architecture for recording audio data. The example audio service architecture comprises applications 520, 525, an audio service 510, and a driver 530. A first application 520 comprises a first audio buffer 522, wherein the first audio buffer 522 is shared with the audio service 510, and a second application 525 comprises a second audio buffer 527, wherein the second audio buffer 527 is shared with the audio service 510. The driver 530 and audio service 510 may share a third audio buffer 532. Sharing buffers between architectural components as shown in FIG. 5 may enable use of VMOs to enable zero-data transfers and/or other data transfers that may enable lower latencies and lower power consumption.

Figure 6:
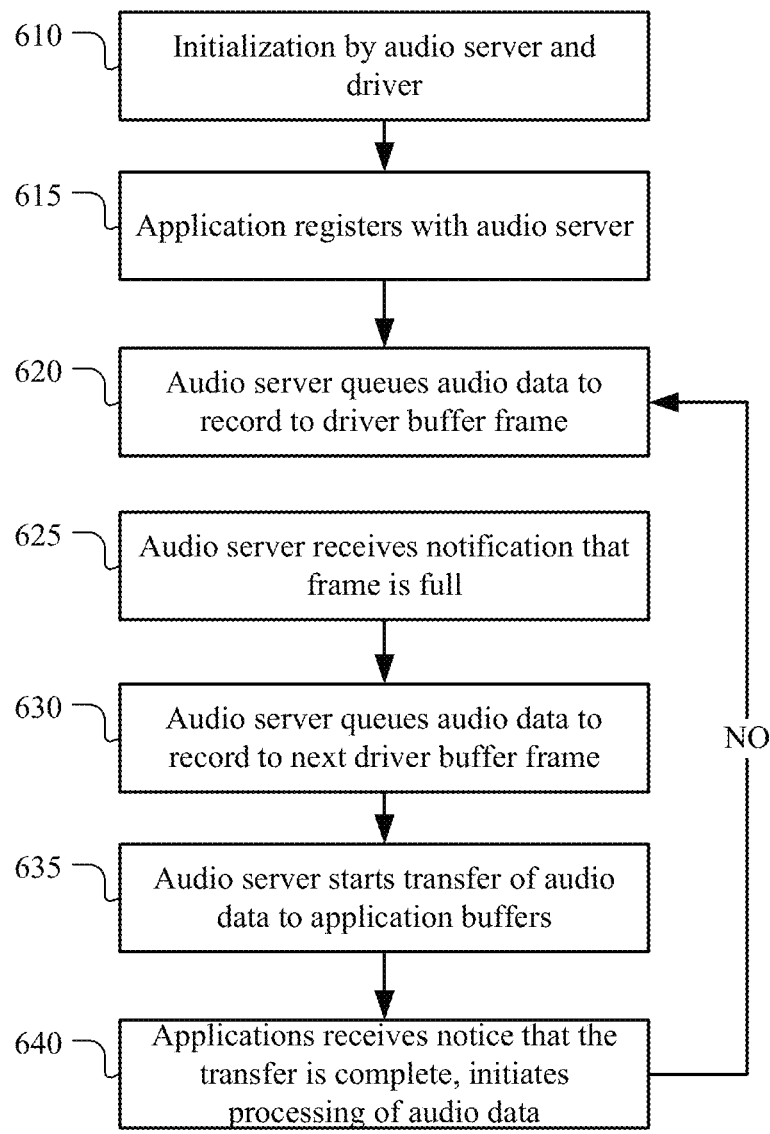
FIG. 6 illustrates an example method for recording audio.

FIG. 6 illustrates an example method 600 for recording audio. The method 600 may begin at step 610, where, during initialization, the driver 530 may allocate an audio buffer 532 for audio data that may be mapped into a VMO. Note that audio buffer 532 may be shared with the audio service 510. This buffer 532 may be chunked into frames corresponding to the DSP frame size.

At step 615, the application 520 may be ready to begin recording audio and registers with the audio service 510 to create an audio buffer 522 for audio data that may be mapped into a VMO shared with the audio service 510. Each application may specify their own audio buffer size based at least in part on latency tolerable to the application. In particular embodiments, the application may allocate a buffer size that is an integer multiple of the DSP frame size. In FIG. 5, application 520 has allocated a larger buffer 522 while application 525 has allocated a smaller buffer 527. As an example and not by way of limitation, a larger buffer may enable reduced power consumption by enabling the application to operate in a low power mode for longer periods and process more audio data before returning to the lower power mode, while smaller buffers may lower latency audio processing.

At step 620, the audio service 510 may begin queueing frames with the driver 530 after at least one application 520, 525 has registered with the audio service 510 to enable audio data recording. As shown in FIG. 5, both applications 520, 525 have both registered with the audio service 510 as shown by the audio buffers 522, 527 configured to be shared with the audio service 510.

At step 625, the audio service 510 may receive a notification when the driver buffer 532 has received a full frame of audio data.

At step 630, the audio service 510 may queue the next frame to ensure all data is captured once a frame in audio buffer 532 has been filled by the driver 530. In particular embodiments, the audio service 510 queueing may occur immediately to prevent audio data loss.

At step 635, the audio service 510 may transfer data from audio buffer 532 into both application buffers 522, 527.

At step 640, the audio service 510 may notify the applications 520, 525 when the applications buffers 522, 527 have been filled with the audio data from driver buffer 532. Once the audio data has been transferred to an application buffer 522, 527, the applications 520, 525 may process the audio data as desired to produce a recording. In particular embodiments, the applications 520, 525 may enable beamforming of the recorded audio data for general recording to attempt to emphasize certain audio sources over others. As an example and not by way of limitation, the default recording option may comprise capturing 360 degree audio data, while beamformed audio recording may attempt to capture audio from a single source, for example, a bird song, over the background audio, for example, vehicle traffic. A beamformer may be running in the application's context and may act as a helper function.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for rendering audio including the particular steps of the method of FIG. 6, this disclosure contemplates any suitable method for rendering audio including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, each mode of recording may have independent permissions and/or capabilities to allow high level understanding and control over data available to applications. In particular embodiments, certain applications may be enabled to use VoIP and speech recording modes, while other applications are not enabled to do so. In particular embodiments, certain applications may be enabled to use VoIP and speech recording modes with appropriate permissions.

Multiple microphones may support multiple modes of recording, including without limitation speech recording, VoIP recording, environment recording, and general recording. Speech recording may support automatic speech recognition, comprise mono lower-bitrate audio data, and may permit beamforming on the headset. VoIP recording may support optimized voice communication and beamforming on the headset. Environment recording may support echo cancellation during recording and may permit recording in which the user's voice is not recorded. General recording may comprise use of multiple microphones and loopbacks, may enable higher bitrates, and may comprise one or more submodes applied in software. Submodes may comprise multi-channel raw audio recording, access to loopbacks, fixed and/or application-defined beamforming, and spherical harmonic audio recording and/or spatial audio recording. Multi-channel raw audio recording may be beneficial for internal development and factory calibration. Access to loopbacks may be beneficial for internal development, factory calibration, and echo rejection. In particular embodiments, the audio architecture may enable routing-only settings including without limitation noise cancellation and "super human hearing" implemented as eye-tracked beamforming.

The example audio architecture may be capable of recording and rendering a variety of audio streams. As an example and not by way of limitation, audio streams may comprise raw microphone audio; wearer speech beam former output, VoIP, and/or automatic speech recognition optimized audio data; environmental spherical harmonic audio recording; environmental beamforming audio recording; echo reference and/or render loopback; object-based audio render streams; spherical harmonic audio rendering streams; head-locked audio streams; and world-locked audio streams.

In particular embodiments, the audio architecture may comprise a synchronized clock reference and time shared by multiple distributed processing components. In particular embodiments, VMOs may coordinate data transfers between applications, the audio service, and drivers based at least in part on the synchronized clock reference. Audio rendering by the audio architecture may be synchronized with real-world elements. In particular embodiments, audio data may be timestamped with a presentation or recording time to enable synchronization with real-world elements and between audio data from multiple sensors or multiple applications. In particular embodiments, both recording audio data and render audio data may travel between architectural components with header metadata including without limitation a stream ID, a presentation or recording time, a sequence number, and one or more flags, for example and without limitation, a silent frame flag. In particular embodiments, render audio packets may include one or more parameters including without limitation gain and pitch shift parameters.

The audio service may be responsible for setting and enforcing audio policy, including without limitation security, global gain, and audio data routing. In particular embodiments, the audio service may provide one or more fine-grain permissions and/or capabilities including without limitation permissions and capabilities for audio playback; high quality (VoIP/human listener) audio recording of the user; high quality audio recording of the environment; high quality (ASR/machine listener) speech recording of the user; echo reference audio streams; and debug audio streams. In particular embodiments, high quality audio recording of the environment; high quality (ASR/machine listener) speech recording of the user may contain rendered audio content echoes. In particular embodiments, echo reference streams may be used to improve ASR results. In particular embodiments, debug streams may comprise one or more of raw microphone audio data, echo references, and various debug tap points.

After applying the security policy, the audio service may still enable multiple applications to record audio data. As an example and not by way of limitation, the microphone may be used to record audio to process a voice ID for one application while simultaneously recording audio to enable voice triggers for a VoIP call by a second application. For security purposes, an application may not be enabled to view the final mixed audio data provided to the driver as the final mixed audio data may comprise audio data provided by one or more other applications. This limitation may prevent secure or private audio data from being leaked between applications.

Audio data may be chunked according to packet sizes recommended by the audio service application program interfaces (APIs). Power for the audio architecture may be a function of the number of packets stored in the audio buffers—the buffer depth—and the packet size, which may influence the wake-up interval of the audio service. In particular embodiments, the audio service APIs may provide guidance regarding minimum and maximum chunk sizes based on considerations including without limitation buffer size requirements and use case. As an example and not by way of limitation, these APIs may identify optimized chunk presets for general purpose use, for minimum latency, and for minimum power consumption. The audio service APIs may also provide an indication of the influence of buffer depth and packet size on buffering delays. As an example and not by way of limitation, the APIs may provide indications of the delay between an application posting audio data and playback of the audio data at the driver based on these configuration parameters.

As an example and not by way of limitation, the audio service may recommend a minimum buffering configuration that avoids audio glitching to very responsive applications, such as audio synchronized with other sensor inputs. As an example and not by way of limitation, the audio service may recommend a larger playback packet and longer time between audio service wake-ups with small duty cycles over longer intervals to enable low power consumption to support all-day music playback. As another example and not by way of limitation, the audio service may recommend a fixed packet size to support a compromise on both power and latency to support non-exclusive audio data such as head-locked audio data and spherical harmonic audio data.

For recording scenarios, the audio service may leverage lower-level timestamped activity detection and confidence data with optionally timestamped accelerator data. The audio service may further provide options to applications to improve confidence data with additional computational requirements or to discard the lower-level timestamped activity detection, confidence data, and optional timestamped accelerator data.

As noted herein, the audio architecture may employ VMOs to enable zero-data transfers, and/or other data transfers. One benefit of the audio architecture may be limiting redundant copying and processing of audio and other data, while enforcing audio policy. Consistent use of timestamps for audio and other data may enable processing to be reused rather than reprocessed to further improve performance.

In particular embodiments, the audio architecture may use the HRTF for processing data. Because the HRTF may comprise personalized data about the user, including without limitation a 3D-model of a user's ears and/or head, the audio architecture may treat the HRTF as biometric data and personally identifiable information that may require additional security precautions, policies, and procedures.

As noted herein, the audio architecture may comprise limiting the number of world-locked audio objects to a specific number, such as 8 or 16 world-locked audio objects, to ensure adequate performance for latency and power requirements. A benefit of the audio service architecture may support multiple applications each attempting to render audio. The audio architecture may further support a large number of applications attempting to record audio, and may support real-time audio recording. The audio architecture may also support transferring audio data to the large number of applications as well as providing notifications to the applications upon successful data transfer.

Figure 7:
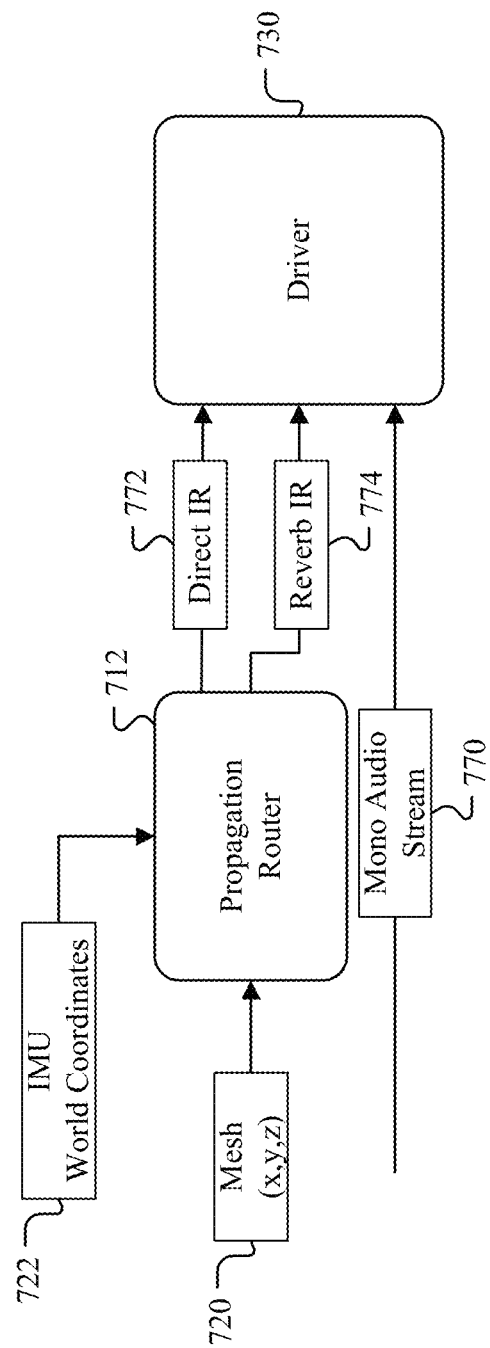
FIG. 7 illustrates an example propagation router architecture.

FIG. 7 illustrates an example propagation router architecture. In particular embodiments of the audio architecture, a driver 730 may receive a mono audio stream 770, a direct propagation impulse response 772, and a reverb impulse response 774 to render world-locked audio. The propagation router 712 may use the world-locked location of an audio source 722 with a SLAM/IMU-generated mesh 720 to generate the direct propagation impulse response 772 and reverb impulse responses 774 for provision to the driver 730. In particular embodiments, the location data may be provided by an application. Impulse responses 772, 774 may be combined with the user location and user pose (also received from the SLAM/IMU) and the HRTF to create accurate spatial audio. The production of spatial audio associated with world-locked audio objects may be computationally intensive. Accordingly, as noted herein, the number of world-locked audio objects may be limited.

Figure 8:
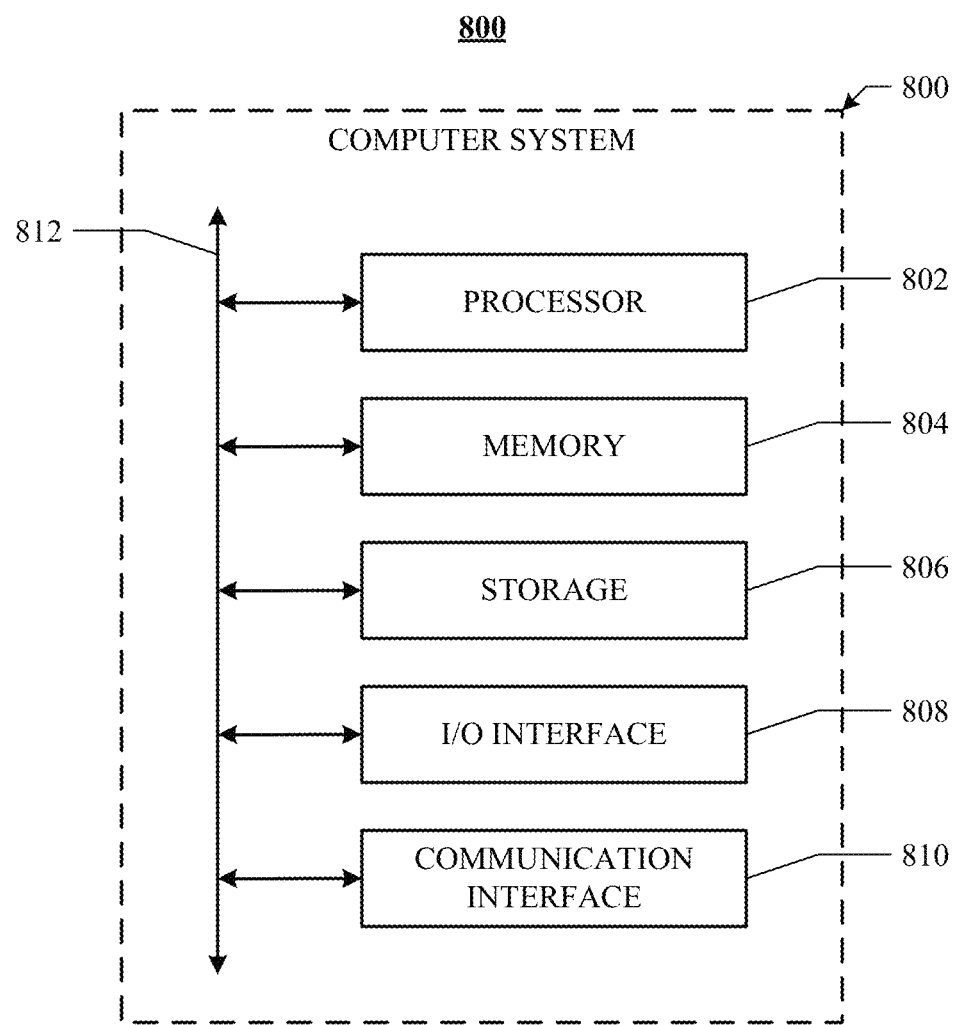
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an artificial/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Embodiments of the invention may include or be implemented in conjunction with an artificial reality system. Artificial reality is a form of reality that has been adjusted in some manner before presentation to a user, which may include, e.g., a virtual reality (VR), an artificial reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an audio service executing on a computing device:
   receiving, from one or more applications, world-locked audio objects, wherein each of the world-locked audio objects is associated with a coordinate within a three-dimensional environment;
   identifying a first subset of the world-locked audio objects and a second subset of the world-locked audio objects, wherein the first subset includes a predetermined number of world-locked audio objects permitted by the audio service and the second subset includes one or more of the world-locked audio objects that are excluded from the first subset;
   generating, based on the second subset of the world-locked audio objects and their associated coordinates, a spherical harmonic object to represent the one or more of the world-locked audio objects in the second subset; and
   sending data associated with the first subset of the world-locked audio objects and the spherical harmonic object to an audio driver configured to render audio for the world-locked audio objects for simultaneous output.

2. The method of claim 1, wherein the generating the spherical harmonic object is further based on at least one of a headset-related transfer function, location, or pose of a user relative to the three-dimensional environment.

3. The method of claim 1, wherein the coordinate within the three-dimensional environment defines an audio source location.

4. The method of claim 1, wherein the data associated with the first subset of world-locked audio objects comprises direct propagation impulse responses, reverb impulse responses, and mono audio streams.

5. The method of claim 4, further comprising:
generating the direct propagation impulse responses and reverb impulse responses based on at least one of a headset-related transfer function, location, or pose of a user relative to the three-dimensional environment.

6. The method of claim 5, wherein the generating the direct propagation impulse responses and reverb impulse responses is further based on a three-dimensional model of at least a portion of the three-dimensional environment.

7. The method of claim 1, further comprising:
receiving one or more additional spherical harmonic objects;
wherein the generating the spherical harmonic object is further based on the one or more additional spherical harmonic objects.

8. The method of claim 1, further comprising:
receiving one or more head-locked audio objects; and
wherein the data associated with the first subset of world-locked audio objects and the spherical harmonic object is further associated with the one or more head-locked audio objects.

9. The method of claim 1, wherein an operating system of the computing device comprises the audio service.

10. The method of claim 1, wherein the one or more applications and the audio driver are each coupled to a synchronized clock reference.

11. One or more computer-readable non-transitory storage media embodying software that is operable when executed by a client device to:
receive, from one or more applications, world-locked audio objects, wherein each of the world-locked audio objects is associated with a coordinate within a three-dimensional environment;
identify a first subset of the world-locked audio objects and a second subset of the world-locked audio objects, wherein the first subset includes a predetermined number of world-locked audio objects permitted by an audio service of the client device and the second subset includes one or more of the world-locked audio objects that are excluded from the first subset;
generate, based on the second subset of the world-locked audio objects and their associated coordinates, a spherical harmonic object to represent the one or more of the world-locked audio objects in the second subset; and
send data associated with the first subset of the world-locked audio objects and the spherical harmonic object to an audio driver configured to render audio for the world-locked audio objects for simultaneous output.

12. The media of claim 11, wherein the coordinate within the three-dimensional environment defines an audio source location.

13. The media of claim 11, wherein the data associated with the first subset of world-locked audio objects comprises direct propagation impulse responses, reverb impulse responses, and mono audio streams.

14. The media of claim 11, wherein the software is further operable when executed by the client device to:
receive one or more additional spherical harmonic objects; and
wherein the generating the spherical harmonic object is further based on the one or more additional spherical harmonic objects.

15. The media of claim 11, wherein the software is further operable when executed by the client device to:
receive one or more head-locked audio objects to be simultaneously output with the world-locked audio objects; and
wherein the data associated with the first subset of world-locked audio objects and the spherical harmonic object is further associated with the one or more head-locked audio objects.

16. A client device comprising:
one or more processors; and
one or more computer-readable non-transitory storage media coupled to one or more of the one or more processors and comprising instructions operable when executed by one or more of the one or more processors to cause the client device to:
receive, from one or more applications, world-locked audio objects, wherein each of the world-locked audio objects is associated with a coordinate within a three-dimensional environment;
identify a first subset of the world-locked audio objects and a second subset of the world-locked audio objects, wherein the first subset includes a predetermined number of world-locked audio objects permitted by an audio service of the client device and the second subset includes one or more of the world-locked audio objects that are excluded from the first subset;
generate, based on the second subset of the world-locked audio objects and their associated coordinates, a spherical harmonic object to represent the one or more of the world-locked audio objects in the second subset; and
send data associated with the first subset of the world-locked audio objects and the spherical harmonic object to an audio driver configured to render audio for the world-locked audio objects for simultaneous output.

17. The client device of claim 16, wherein the coordinate within the three-dimensional environment associated with each of the world-locked audio objects defines an audio source location within the three-dimensional environment.

18. The client device of claim 16, wherein the data associated with the first subset of world-locked audio objects comprises direct propagation impulse responses, reverb impulse responses, and mono audio streams.

19. The client device of claim 16, wherein the instructions are further operable when executed by the one or more processors to:
receive one or more additional spherical harmonic objects;
wherein the generating the spherical harmonic object is further based on the one or more additional spherical harmonic objects.

20. The client device of claim 16, wherein the instructions are further operable when executed by the one or more processors to:
receive one or more head-locked audio objects; and wherein the data associated with the first subset of world-locked audio objects and the spherical harmonic object is further associated with the one or more head-locked audio objects.

\* \* \* \* \*